Nov. 10, 1936.    R. W. HIPPEN ET AL    2,060,213
PROJECTILE
Filed July 9, 1934    2 Sheets-Sheet 1
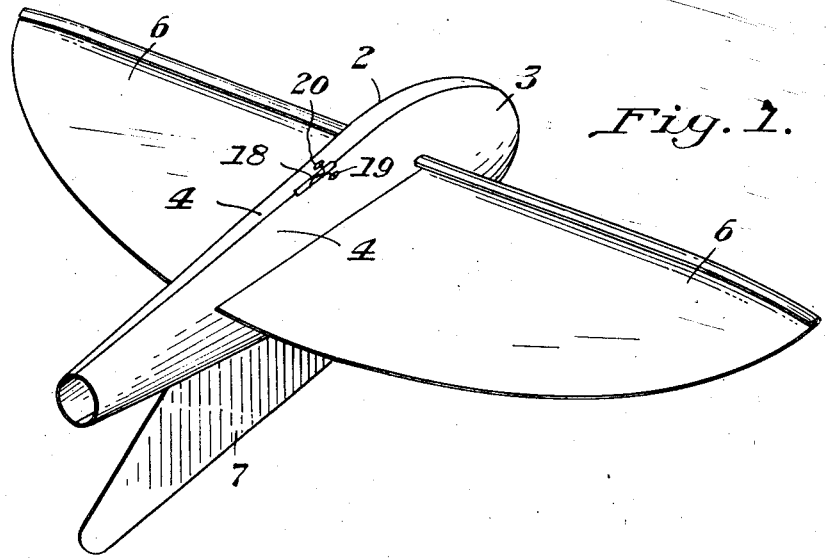
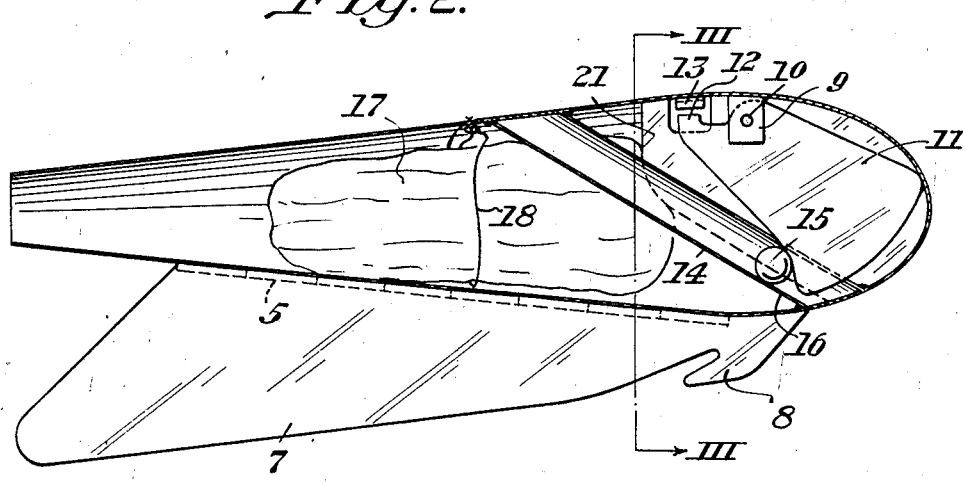
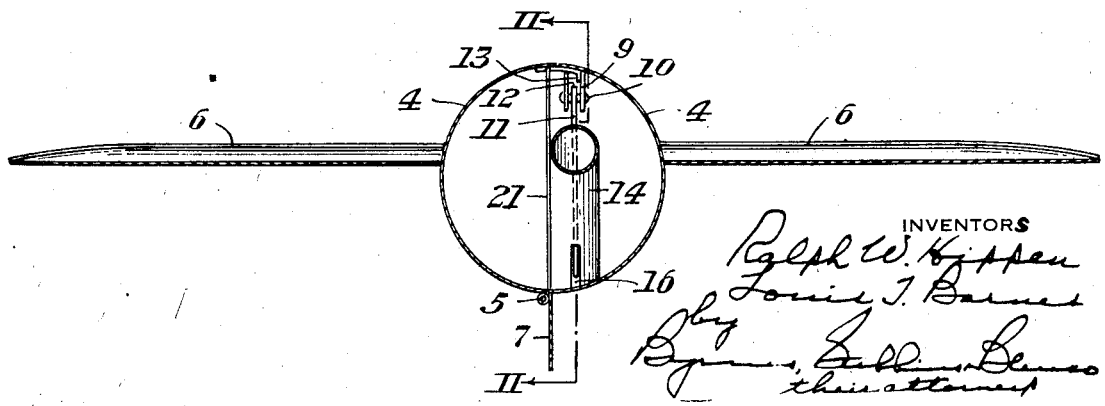

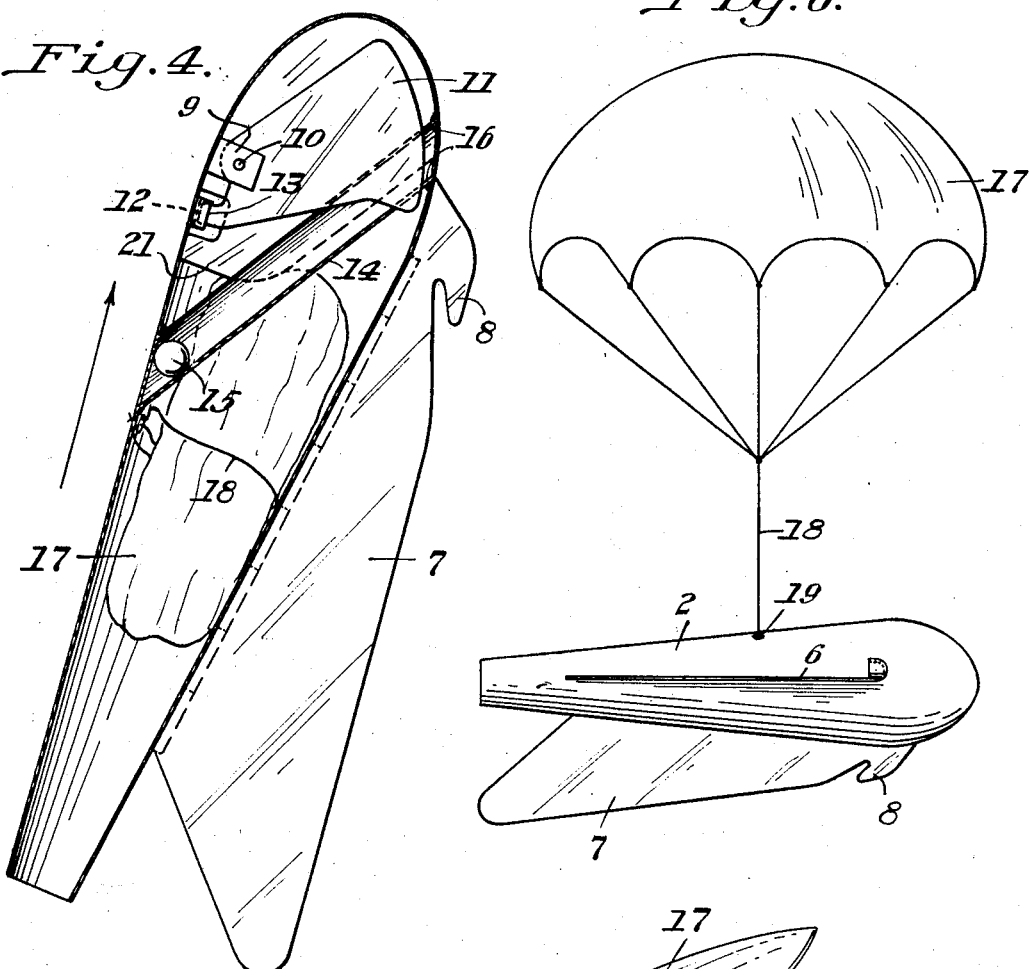

Patented Nov. 10, 1936

2,060,213

UNITED STATES PATENT OFFICE 2,060,213

PROJECTILE

Ralph W. Hippen and Louis T. Barnes, Oklahoma City, Okla.; said Barnes assignor to said Hippen Application July 9, 1934, Serial No. 734,258

6 Claims. (Cl. 46—76)

This invention relates broadly to projectiles, and more particularly to projectiles having gravity actuated means for opening the projectiles or releasing or discharging means carried thereby. In certain of its more specific aspects the invention relates to a projectile carrying a parachute and adapted at a predetermined point in its flight to release or discharge the parachute.

The invention is particularly adaptable for application to toy projectiles and will hereinafter be described purely for the sake of illustration and explanation as embodied in a toy projectile, but it is to be distinctly understood that the features described and claimed are useful in projectiles other than toy projectiles and the invention may be otherwise variously embodied.

The particular specific embodiment of the invention selected for illustration in the drawings is a toy projectile of the type adapted to be projected into the air and having an openable casing the opening of which is controlled by gravity actuated means. A parachute is contained within the casing and is adapted to be released or discharged when the casing opens and is connected with the casing in such manner as to prevent the same from falling freely and to support it during descent. Certain features of the invention, however, as will presently become apparent, are independent of whether or not a parachute is carried within the casing. The invention has to do particularly with means for controlling the flight of the projectile and insuring opening of the casing approximately at a predetermined point in its flight.

Toys comprising casings containing parachutes adapted to be released in flight and to support the casings upon descent are not new. Numerous toys of this character have heretofore been proposed. The particular problem encountered in the manufacture of toys, or other projectiles, of this character is insuring opening of the casing or release of the parachute at the desired point in the flight of the projectile. Various devices have heretofore been proposed for this purpose, but none of them has been entirely satisfactory. It has been proposed to employ a casing rendered openable by a screw connected with a propeller or fan operated by air pressure upon movement of the projectile through the air, the parachute being released after a predetermined number of turns of the screw. Such a provision is not satisfactory because uncertain in operation and because the toy descends in two pieces, the parachute becoming separated from the body of the projectile.

Most attempts at providing projectiles of the character in question have embodied means intended to be actuated by gravity at a predetermined point in the flight of the projectile to control opening of the casing or release of the parachute. Projectiles of this type have been fashioned in various shapes, such as arrows, human figures, etc., and have been designed to be projected into the air with a predetermined portion of the projectile forward as, for example, the point of the arrow or the feet of the human figure, such portion being weighted to cause the projectile to move with its axis substantially tangent to the trajectory throughout its flight and to eliminate end for end turning of the projectile. These projectiles have been provided with means, such as a ball or a counterweight, intended to be actuated by gravity upon a change in the inclination of the projectile to permit release of the parachute. For example, in one attempt a ball operable in a tube was utilized, the ball operating a latch permitting opening of the casing when moved to one end of the tube. This end of the tube would be forward as the projectile is projected into the air and at or approximately at the high point in the trajectory the tube would be turned so that the latch end would be downward. However, at the high point in the trajectory the projectile would tend to partake of the characteristics of a freely falling body as its nose or forward portion would be downward and it would tend to plummet down to the ground. But one of the characteristics of freely falling bodies is that all such bodies, eliminating air friction, fall with the same acceleration. Therefore, in the type of construction just referred to the casing and the ball would both fall with substantially the same acceleration and the ball would not move downward in the tube far enough or with sufficient acceleration relative to the casing to actuate the latch. The ball might move part way through the tube but not far enough to actuate the latch. It might move all the way through the tube to the latch but not strike the latch with sufficient force to actuate it. The ball might actuate the latch but after such a long time that the projectile would be nearing the ground and the desired effect would be entirely lost. The gravity actuated mechanism for actuating the latch might operate at times possibly due to swaying or turning of the projectile which would by centrifugal force throw the ball out against the latch, but in ordinary operation devices of this character are, to all intents and purposes, inoperative and useless for the purpose intended. We have proved this by actual demonstration with working models.

We have provided a projectile which overcomes the defects, disadvantages and uncertainties of the projectiles referred to above. We provide means for controlling the flight of the projectile so as to insure operation of the gravity actuated means for operating the latch permitting opening of the casing. We control the flight of the projectile so that at the high point in its trajectory the force of gravity acting on the projectile and tending to cause it to plummet down is counteracted at least to a sufficient extent to permit the latch actuating ball to move downwardly in the tube under the force of gravity so as to actuate the latch. In other words, we provide against the projectile assuming or approximately assuming the characteristics of a freely falling body at or immediately after the high point in its trajectory. Our projectile has a very definite tendency against falling, and in fact tends to move generally horizontally for a time at least, giving ample opportunity for gravity actuation of the latch permitting opening of the casing and release of the parachute. The casing is supported by the parachute during falling and the construction is such that the means connecting the casing with the parachute closes the casing to cause the falling toy to have a more pleasing appearance than if the casing should remain open.

We preferably provide on the casing means preventing the casing from falling freely when projected into the air or means tending to counteract the tendency of the force of gravity to cause the casing to fall freely in flight. In the particular preferred embodiment of the invention selected for the purposes of description and illustration the casing assumes the shape of an airplane having oppositely disposed wings and a rudder, the casing being hinged along the center line of the fuselage at the bottom and being latched at the top and having gravity actuated means for operating the latch to control opening of the casing. When the casing opens the two opposite winged sections tend to fall away from one another, permitting the parachute to emerge from within the casing. The casing is then closed and supported by the parachute during falling, as above stated.

Other details, objects and advantages of the invention will become apparent as the following description of a present preferred embodiment thereof proceeds.

In the accompanying drawings we have shown a present preferred embodiment of the invention, in which Figure 1 is a perspective view of a toy projectile;

Figure 2 is a vertical longitudinal cross-sectional view to enlarged scale through the projectile shown in Figure 1, taken on the line II—II of Figure 3;

Figure 3 is a vertical transverse cross-sectional view through the projectile, taken on the line III—III of Figure 2;

Figure 4 is a view similar to Figure 2 but showing the projectile in a different operative position and, together with Figure 2, illustrating operation of the latch;

Figure 5 is a perspective view showing how the projectile is opened and the parachute released; and Figure 6 is a plan view showing the projectile supported by the parachute during falling.

Referring now more particularly to the drawings, there is shown a projectile fashioned in the form of an airplane designated generally by reference numeral 2 comprising a hollow sheet metal casing 3 made up of opposed halves 4. The opposed halves of the casing are hinged together at 5 at a point corresponding to the bottom center line of the fuselage and each carries a wing 6. A rudder 7 is also provided for insuring movement of the projectile substantially straight ahead. The forward part of the rudder is provided with a hook 8 for a purpose to be presently described.

Carried by the right-hand half 4 of the casing is a bracket 9 to which is pivoted at 10 a latch 11 having the shape shown in Figure 2. The latch 11 is provided with a latching projection 12 adapted to cooperate and lie to the left, viewing Figure 3 of a keeper 13 connected with the left-hand half 4 of the casing. The two positions of the latch 11 are shown respectively in Figures 2 and 4, in the former of which it is inoperative and in the latter operative to maintain the casing closed.

Mounted within the right-hand half of the casing viewing Figure 3, in longitudinal alignment with the latch 11 is an inclined tube 14. Within the tube is a freely movable ball 15. The forward portion of the tube is slotted, as shown at 16, to permit the lower portion of the latch 11 to pass therethrough, this serving the double function of providing a guide for the latch and enabling the latch to move into cooperative relationship with the ball 15 so as to be operated thereby.

Adapted to be carried within the hollow casing 3 is a parachute 17 of usual construction which is connected with the casing by a line 18. The line 18 passes through a hole 19 in the right-hand half of the casing and then is connected with an eye 20 in the left-hand half. Mounted within the forward portion of the casing is a plate 21 to keep the parachute back from the nose of the casing and insure against fouling of the latch by the parachute.

In preparing the projectile for use the parachute is folded in such manner that upon opening of the casing it may readily be discharged therefrom so as to open up and support the casing during falling and is then inserted into the casing, preferably with the line 18 beneath it as shown in Figure 2, so that when the casing opens the line will not be in the way and will permit proper release and opening of the parachute. Before closing the casing it is held in such position that the ball 15 is forward against the latch 11 to hold the latch in inoperative position as shown in Figure 2. The opposite halves of the casing are then pivotally moved about the hinge 5 to closed position, whereupon the casing is tilted back to the position shown in Figure 4. The ball 15 moves to the end of the casing due to the force of gravity and the latch 11 moves to latched position, also due to the force of gravity. The casing is now latched closed with the parachute inside it and is adapted to be projected.

The projectile is projected by any suitable means such, for example, as a slingshot having a resilient projecting device such as a rubber band, which is adapted to be received by the hook 8, whereupon the projectile is drawn back to stretch the rubber band and is then let go and projected by the rubber band up into the air. The projectile is preferably projected upwardly at a fairly steep angle, as indicated in Figure 4, although this angle may be varied as desired. During upward movement of the projectile the ball is maintained at the rear end of the tube 14 and the latch is maintained in operative position by gravity and inertia. The rudder tends to maintain the projectile on a straight course and as the projectile nears the apex of its flight it tends, by reason of being somewhat heavy in the nose and by reason of its design to simulate an airship, to level off and fly, at least for a time, generally horizontally rather than immediately turning its nose downwardly and plummeting to the ground. The wings 6 are, as shown in the drawings, made as airfoils, tending to counteract to a certain extent at least the tendency of gravity to turn the nose of the projectile downwardly. Thus the force of gravity is counteracted by the wings at least to a sufficient extent to cause the casing to hover in the air or move generally horizontally in substantially the position shown in Figure 2, giving the ball 15 an opportunity to move downwardly and forwardly in the tube 14 and actuate the latch to inoperative position as shown in Figure 2. This permits the opposite halves of the casing to open, opening thereof possibly being assisted by outward pressure of the parachute and a tendency of the wings to fall away from one another and permitting release of the parachute. The parachute opens up and, as it is connected with one-half of the casing at 20 and threaded through a hole 19 in the other half, it immediately closes the casing, as indicated in Figure 5, and supports it during falling as shown in Figure 6.

We find that for best results the tube 14 should have approximately the inclination shown, that is to say, in the neighborhood of 45° to the longitudinal axis of the casing. When the projectile is thus designed it is found that the ball moves forward and operates the latch approximately at the apex of flight, thus affording a maximum of amusement and enjoyment with the use of the device. The device has actually been operated and tested and is found to be extremely reliable and to operate practically 100 per cent. of the time.

While we have shown and described a present preferred embodiment of the invention, it is to be distinctly understood that the same is not limited thereto but may be otherwise variously embodied within the scope of the following claims.

We claim:

1. A projectile in the shape of an openable winged airship having a parachute thereon adapted to check the fall thereof and having gravity actuated means controlling opening thereof, and means for closing the projectile during falling.

2. A projectile comprising an openable casing having a parachute therein adapted to check the fall thereof and having gravity actuated means controlling opening thereof, and means for closing the casing during falling.

3. A projectile comprising an openable casing having a parachute therein adapted to check the fall thereof and having means tending to counteract the tendency of the force of gravity to cause the casing with the parachute within it to fall freely in flight, and means for closing the casing during falling.

4. A projectile comprising an openable casing having a parachute therein adapted to check the fall thereof and means cooperating with portions of the casing at opposite sides of the opening for closing the casing during falling.

5. A projectile comprising an openable casing having a parachute therein adapted to check the fall thereof, the parachute being connected with portions of the casing at opposite sides of the opening so as to close the casing during falling.

6. A projectile comprising a hinged openable casing, a parachute, and means connecting the parachute to the casing cooperating with opposed portions of the casing so as to close the same when falling while supported by the parachute.

RALPH W. HIPPEN.
LOUIS T. BARNES.